United States Patent
Piva

[11] 3,806,212
[45] Apr. 23, 1974

[54] ROLLING ELEMENT BEARINGS

[75] Inventor: Nazzareno Piva, Turin, Italy

[73] Assignee: Riv-Skf Officine Di Villar Perosa S.p.A., Turin, Italy

[22] Filed: Oct. 20, 1972

[21] Appl. No.: 299,575

[30] Foreign Application Priority Data
   Nov. 26, 1971  Italy .................................. 70880/71

[52] U.S. Cl. ................ 308/187.2, 277/94, 277/168
[51] Int. Cl. ............................................... F16c 33/78
[58] Field of Search ........ 308/187.2, 187.1; 277/94, 277/168, 169, 170

[56] References Cited
   UNITED STATES PATENTS

| | | | |
|---|---|---|---|
| 3,595,587 | 7/1971 | Senigalliesi | 308/187.2 |
| 3,400,989 | 9/1968 | Dixon et al. | 308/187.2 |
| 3,473,856 | 10/1969 | Helms | 308/187.2 |
| 3,396,977 | 8/1968 | Iguchi | 277/94 |
| 3,572,857 | 3/1971 | Hasegawa | 308/187.2 |

FOREIGN PATENTS OR APPLICATIONS

| | | | |
|---|---|---|---|
| 613,996 | 2/1961 | Canada | 308/187.2 |
| 849,100 | 9/1960 | Great Britain | 277/94 |

*Primary Examiner*—Charles J. Myhre
*Assistant Examiner*—Barry Grossman
*Attorney, Agent, or Firm*—Sughrue, Rothwell, Mion, Zinn & Macpeak

[57] ABSTRACT

A rolling element bearing of the type comprising two annular bearing elements between which run a plurality of rolling elements, in which the interior of the bearing is sealed by an annular seal between the two annular bearing elements. The seal comprises an annular resilient element supported on the inside by a reinforcement washer, the outer diameter of which is less than the outer diameter of the resilient washer. The outer rim of the resilient washer is housed in an annular groove on the inner curved surface of the outer annular bearing member, which separates this surface into a first part, on the inside of the groove, and a second part, on the outside of the groove. The diameter of the said second part is greater than that of the said first part but less than that of the reinforcement washer which thus abuts a shoulder formed by the said first part.

4 Claims, 2 Drawing Figures

PATENTED APR 23 1974  3,806,212
Fig. 1
Fig. 2
Fig. 3
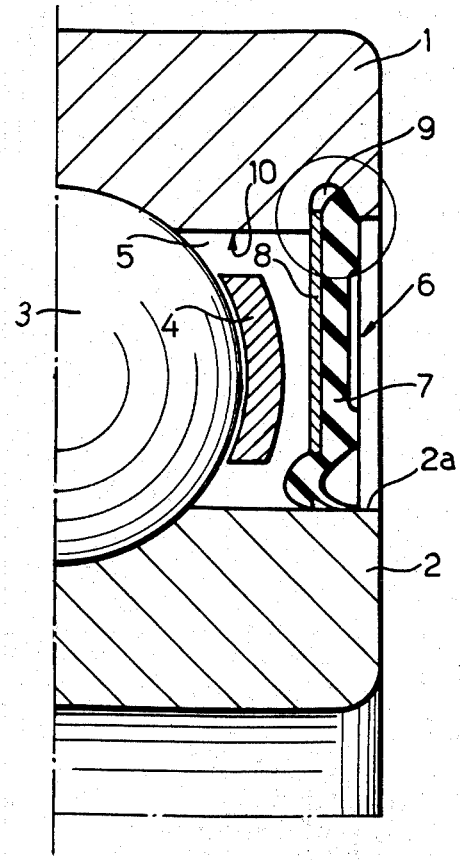
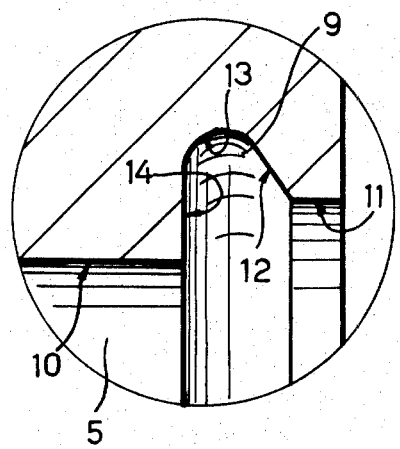
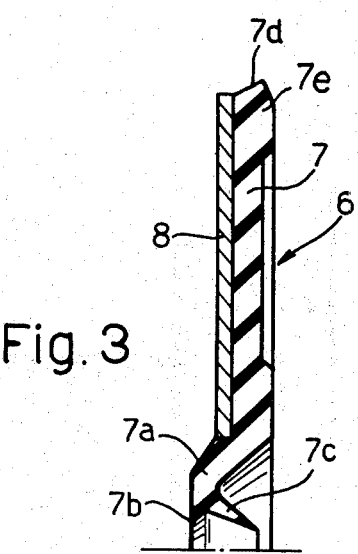

ROLLING ELEMENT BEARINGS

BACKGROUND OF THE INVENTION

The present invention relates to rolling element bearings, and particularly to rolling element bearings of the type in which lubricating oil or grease is sealed in by means of a resilient annular seal which has a pair of tapered holding lips formed on the inner circular edge thereof. On one face of the annular seal there is bonded a metal reinforcing washer the outer diameter of which is less than the outer diameter of the resilient seal and the inner diameter of which is greater than the inner diameter of the resilient seal. When in position on a rolling element bearing, the seal fits into a seat consisting of a circumferential channel or groove cut in the inner curved surface of the outer annular member of the bearing adjacent one of the faces thereof. The channel or groove separates the inner curved surface of the outer annular member of the bearing into two parts, and one part, between the groove or channel and the nearest side face of the member is of greater diameter than the other part to assist fitting the seal into position. When in position the tapered holding lips of the resilient annular seal press against the outer curved surface of the inner annular bearing member of the rolling element bearing.

In such bearings which will be referred to hereinafter as bearings "of the type described," one of the greatest problems arises due to the difficulty of producing adequate anchorage for the seals in the channels or grooves formed in the outer annular bearing members.

It is known that as the speed and temperature at which the bearings operate increases there is a corresponding increase in the stresses put on the seal. Friction which inevitably develops in the zone of contact between the sliding lips and the inner annular member of the bearing, tends to cause the seal to rotate with respect to the other annular member on which it is mounted. In addition, internal pressure on the seal, which increases as the temperature increases, due to the heat developed by the friction, creates an outward thrust tending to loosen the outer edge of the seal from its seat and to expel it from the bearing.

For security, the structure of the seals and their seats on the annular members must, however, be such that even under such severe operating conditions a tight fit of the seal in its seat is maintained so that the seal is not expelled from the bearing as a result of the pressure difference between the inside and the outside of the bearing.

Such seals are, however, required to be capable of being readily assembled by resilient deformation into the groove or channel forming the seat, and the form of the latter must be such as to render the assembly easy and inexpensive. This requirement for snap action assembly, however, makes it difficult to avoid the expulsion of the seal by a similar action when the pressure difference across the seal increases due to an increase in operating temperatures.

In known bearings of the type described the anchorage of the seal to the bearing is not entirely satisfactory. The outer diameter of the metal reinforcement washer is rather less than the adjacent part of the inner diameter of the outer annular member of the bearing, and the outer rim of the seal, which fits into the channel or groove in the inner face of the outer member is constituted solely by the outer rim of the annular member of resilient material. In order to achieve a tight fit the resilient annular member is made oversize, but the excess material to fit into the channel creates problems involving the precompression of the material, until the edge of the seal has completely entered the channel; this is difficult to achieve in practice and, even so, does not guarantee secure anchorage between the seal and the bearing.

Therefore attempts have been made to obviate the above-mentioned disadvantages, by forming the channel with a particular profile; these attempts, however, have not met with success.

A further known attempted solution to these problems consists in shaping the external edge of the annular resilient part of the seal in a particular manner in an attempt to stabilise the contact with the wall of the channel in correspondence with a plurality of circles or annular zones. This arrangement, however, has the disadvantage that the circular or annular zones constitute fulcra around which the outer rim of the seal may revolve and be expelled from the groove or channel in the annular member of the bearing, by the effect of the difference between the pressures inside and outside the bearing.

OBJECTS OF THE INVENTION

The object of the present invention is to provide a bearing of the type described, in which the requirements set forth above are satisfied and which does not have the disadvantages of the prior art types also referred to above.

SUMMARY OF THE INVENTION

According to the present invention, there is provided a rolling element bearing of the type having an annular seal located between the inner and outer annular bearing members, the seal comprising an annular resilient member the inner rim of which is formed as two tapered lips which engage the outer curved surface of the inner annular emmber of the bearing, and a reinforcement washer attached to one face of the annular resilient element, the outer diameter of the reinforcement washer being less than the outer diameter of the annular resilient element and the outer rim of the annular resilient element, which projects beyond the reinforcement washer, being housed in an annular channel formed in the inner curved surface of the outer annular member, the channel separating the said inner curved surface into two parts, a first part extending inwardly from the channel toward the tracks of the rolling elements, and a second part extending between the channel and the adjacent side face of the outer annular bearing member, the second part of the said inner curved surface having a greater diameter than the first part thereof and the side wall of the annular channel which intersects the said second part of the inner curved surface of the outer annular bearing member being inclined with respect to the axis of the bearing, characterised in that the outer diameter of the reinforcement washer is greater than the diameter of the second part of the inner curved surface of the outer annular bearing member, in that the outer rim of the annular, resilient member is an asymmetric V-shape in axial section, one face of the V-shaped rim forming a greater angle with the axis of the annular resilient member than the other face, and the apex of the V being nearer the external face of the annular resilient member than the internal face to which the reinforcement washer is attached.

It has been found that to obtain a satisfactory method of assembly of the seal in the bearing and at the same time to ensure that the danger of expulsion of the seal from the seat during operation of the bearing is minimised, the external diameter of the metal washer must be greater than the inner diameter of the outer annular member of the bearing by 0.3 to 0.5 mm according to the dimensions of the bearing.

In a preferred embodiment the diameter of the reinforcement washer is substantially the same as that of the internal radial face of the annular resilient element such that the outer perimeter of the reinforcement washer coincides with the junction between the internal inclined face of the V-shaped rim, and the internal radial face, of the annular resilient element. In such an embodiment it is preferred that the external inclined face of the V-shaped rim of the annular resilient element makes with respect to the axis of the bearing is greater than the angle with respect to the axis of the bearing which is made by the corresponding inclined face of the annular channel in the inner curved surface of the outer annular bearing member.

It is appreciated that bearings in which there are metal reinforcement washers associated with an annular disc made of resilient material and having an external diameter greater than the diameter of the second part of the curved inner surface of the outer annular member of the bearing, are known in themselves. However, in such bearings the washer is arranged on the side of the seal which faces outwardly when the bearing is assembled, and the only provision to enhance tightness is an axial rib formed in the resilient annular member at a certain distance from the outer rim thereof. Such an arrangement does not, however, guarantee good tightness since the axial rib is directly exposed to the action of the pressure within the bearing, and above all does not offer satisfactory security against expulsion of the seal due to the considerable axial play with which the outer rim of the seal is mounted in the channel.

Various other features and advantages of the invention will become apparent from a consideration of the following description with reference to the accompanying drawing which is given purely by way of nonrestrictive example.

BRIEF DESCRIPTION OF THE DRAWINGS

FIG. 1 is a partial axial section of a rolling element bearing according to this invention;

FIG. 2 is a section on an enlarged scale of a part of the outer annular member of the rolling element bearing illustrated in FIG. 1; and FIG. 3 is a partial axial section of the seal before it is mounted on the bearing.

DESCRIPTION OF THE PREFERRED EMBODIMENTS

Referring now to the drawings, the inner and outer annular members of a rolling element are indicated with the reference numerals 2 and 1 respectively. Between the annular members 1 and 2 there are rolling elements 3, in the present embodiment, balls, and these are held in position spaced around their track, by a cage 4.

The internal space 5 of the bearing is closed laterally on each side of the bearing by a seal generally indicated at 6. The seal 6 comprises a resilient annular member 7 preferably made of a synthetic material which is joined, for example by vulcanizing or by the use of suitable adhesives, to a metal reinforcement washer 8. The inner rim 7a of the resilient annular member 7 is of smaller diameter than the inner rim of the washer 8 and is formed as two tapering lips, 7b and 7c which, when the seal 6 is mounted in the bearing, as illustrated in FIG. 1, are resiliently deformed and engage against the outer curved surface 2a of the inner annular bearing member 2 of the bearing.

The outer rim of the seal 6 is mounted in an annular channel 9 formed in the inner curved surface of the outer annular member 1 and separates the inner curved surface into two parts: a first part 10 which extends from the channel 9 toward the tracks of the rolling elements, and a second part 11 which extends from the channel 9 to the adjacent lateral face of the outer annular member 1 of the rolling element bearing.

The channel 9 is shaped so that it has a face which is inclined with respect to the axis of the bearing, diverging from the floor 13 of the channel 9 towards the second part 11 of the curved inner surface of the outer annular member 1.

The floor 13 of the channel 9 is curved in cross section and has a constant radius. The remaining face or wall 14 of the channel 9 is tangential to the curve of the floor 13 and the plane of the face 14 extends radially with respect to the centre of the bearing.

The outer part 11 of the curved inner surface of the outer annular member of the bearing has a greater diameter than the first part 10 of this surface so that the radial face 14 forms a shoulder against which abuts the metal reinforcement washer 8, the external diameter of which is greater than the diameter of the first part 10 of the inner curved surface by an amount between 0.3 and 0.5 mm.

The outer rim of the seal 6 is formed such that the resilient annular member 7 projects beyond the outer periphery of the reinforcement washer 8 and has a V-shaped cross section which is asymmetric so that the apex of the V lies rather to one side of the seal. The diameters of the annular washers 7 and 8 are such that the outer diameter of the washer 8 lies adjacent the junction between the radial face of the washer 7 and an inclined face 7d which forms one face of the V-shaped rim. The other inclined face 7e of the V-shaped rim forms with the axis of the bearing an angle slightly greater than the angle which the face 12 of the channel 9 makes with respect to the axis. The size of the face 7e is approximately the same as that of the face 12 of the channel so that contact is made over the whole of the available area.

I claim:

1. In a rolling element bearing of the type comprising, inner and outer annular bearing members,
a plurality of rolling elements between said inner and outer annular bearing members,
an annular seal between said inner and outer annular bearing members, said seal comprising,
an annular resilient element, and
an annular reinforcement washer attached to one face of said annular resilient element, the outer diameter of said reinforcement washer being less than the outer diameter of said annular resilient element and the inner diameter of said reinforcement washer being greater than the inner diameter of said annular resilient element, an annular groove in the inner curved surface of said outer annular bearing member, said annular groove separating said inner curved surface of said outer annular bearing member into a first part and a second part, said first part extending between said annular groove and the bearing tracks of said outer annular bearing member, and said second part extending between said annular groove and the adjacent external side face of said outer annular bearing member, the diameter of said second part being greater than the diameter of said first part, the side wall of said annular groove which intersects said second part of said inner curved surface of said outer annular bearing member being inclined with respect to the axis of said bearing, the improvement wherein, the said outer diameter of said reinforcement washer is greater than the diameter of said second part of said inner curved surface of said outer annular bearing member and abuts against a shoulder formed by said first part thereof, being in the inside of said resilient annular member of said seal, the outer rim of said annular resilient member is an asymmetric V-shape in axial section, the outer inclined face of said V-shaped rim forming a greater angle with respect to said axis of said bearing than the angle formed with said axis by the inner inclined face of said rim, the apex of said V-shaped rim being nearer the external side face of said annular resilient element than the internal side face thereof to which said reinforcement washer is attached.

2. The rolling element bearing of claim 1 wherein the outer diameter of said reinforcement washer is greater than the diameter of said first part of said inner curved surface of said outer annular bearing member by an amount between 0.3 mm and 0.5 mm.

3. The rolling element bearing of claim 1 wherein the outer diameter of said reinforcement washer is substantially the same as the outer diameter of the internal radial face of the annular resilient element such that the outer perimeter of said reinforcement washer coincides with the function between said internal radial face of said annular resilient element and said internal inclined face of said V-shaped rim of said annular resilient element.

4. The rolling element bearing of claim 1 wherein the angle between said external inclined face of said V-shaped rim of said annular resilient element of said seal and said axis of said bearing is greater than the angle between said axis and said corresponding inclined face of said groove in said inner curved surface of said outer annular bearing member.

* * * * *